United States Patent [19]
Inoue et al.

[11] Patent Number: 5,172,961
[45] Date of Patent: Dec. 22, 1992

[54] VEHICLE BRAKE SYSTEM INCLUDING CORNERING CHARACTERISTIC CONTROL

[75] Inventors: Hideaki Inoue, Yokosuka; Hirotsugu Yamaguchi, Chigasaki; Sunao Hano; Shinji Matsumoto, both of Yokosuka, all of Japan

[73] Assignee: Nissan Motor Co. Ltd., Yokohama, Japan

[21] Appl. No.: 725,310

[22] Filed: Jul. 5, 1991

[30] Foreign Application Priority Data

Jul. 5, 1990 [JP] Japan .................................. 2-176529

[51] Int. Cl.$^5$ .............................................. B60T 8/58
[52] U.S. Cl. ..................................... 303/100; 180/142; 303/9.62; 303/103
[58] Field of Search ...................... 303/100, 94, 97, 103, 303/107, 108, DIG. 1-4, 9.62; 280/142, 143, 91; 364/426.1

[56] References Cited

U.S. PATENT DOCUMENTS

| | | | |
|---|---|---|---|
| 4,521,856 | 6/1985 | Phelps et al. | 303/94 |
| 4,679,809 | 7/1987 | Ito et al. | 280/91 |
| 4,763,260 | 8/1988 | Sakuma et al. | 303/100 |
| 4,794,539 | 2/1988 | Wallentowitz et al. | 303/100 |
| 4,998,593 | 3/1991 | Karnopp et al. | 180/142 X |
| 5,001,637 | 3/1991 | Shiraishi et al. | 180/142 |
| 5,050,940 | 2/1991 | Bedford et al. | 303/DIG. 4 |

FOREIGN PATENT DOCUMENTS 59-155264 10/1984 Japan .
1-208255 8/1989 Japan .

*Primary Examiner*—Matthew C. Graham
*Attorney, Agent, or Firm*—Foley & Lardner

[57] ABSTRACT

In order to improve the cornering of a vehicle under braking, control is based on the single angle and the rate at which the steering angle is changing. When the rate at which the steering angle is changing is high the braking force on the outboard side of the vehicle with respect to the direction in which it is turning, is reduced with respect to that on the inboard side while in the case that the steering angle is relatively large, the braking force on the inboard side is reduced with respect to that on the outboard side. As an alternative to brake force reduction, it is possible to increase the braking force on the side opposite to that wherein reduction would be implemented. Parameters which are used to weight the control are steering angle acceleration, which speed, and vehicle deceleration.

19 Claims, 14 Drawing Sheets

VEHICLE BRAKE SYSTEM INCLUDING CORNERING CHARACTERISTIC CONTROL

BACKGROUND OF THE INVENTION

1. Field of the Invention

The present invention relates generally to automotive braking systems and more specifically to a braking control system which enables the braking force distribution to be controlled in a manner whereby the cornering characteristics of the vehicle can be suitably modified.

2. Description of the Prior Art

JU-A-59-155264 discloses a braking control system which has been proposed in order to improve vehicle cornering characteristics. This arrangement is such that when under braking the system delays the application of the outboard wheels (viz., the wheels on the outside of the curved path the vehicle is traversing) with a view of improving the ease with which yaw can be induced.

However, with this arrangement the braking control is based solely on the steering angle and has induced the problem that, as the control technique employs delaying the application of the outboard brakes so as to facilitate yaw, after yaw has been facilitated, suitable vehicle stability has not been obtained.

JP-A-1-208255 discloses an arrangement wherein the rate or speed at which steering is being induced is used as the basis for controlling the braking force applied the rear inboard wheel. However, with this technique the expected improvement in the ease with which yaw can be induced is not realized.

SUMMARY OF THE INVENTION

It is an object of the present invention to provide a control arrangement which utilizes the steering angle and the rate at which the steering angle is changing in order to induce a suitable yaw rate and then stably maintain the same during cornering.

In brief, the above object is achieved by an arrangement wherein control is based on the steering angle and the rate at which the steering angle is changing. When the rate at which the steering angle is changing is high and the steering angle is relatively small the braking force on the outboard side of the vehicle with respect to the direction in which it is turning, is reduced while in the case that rate at which the steering angle is changing is low and the steering angle is relatively large, the braking force on the inboard side is reduced. As an alternative to brake force reduction, it is possible to simultaneously increase the braking force on the side opposite to that wherein reduction would be being implemented, in order to achieve the required braking force differential.

Parameters which are used to weight the control are steering angle acceleration, vehicle speed, and vehicle deceleration. Alternatively weighting can be executed manually according to taste.

More specifically, a first aspect of the present invention comes in a method of controlling the brakes of an automotive vehicle comprising the steps of: sensing the steering angle; deriving the rate at which the steering angle is changing; sensing the application of the brakes; deriving the braking force difference which should be established between a road wheel on a first side of the vehicle and a road wheel which is on a second side of the vehicle using the sensed steering angle and derived speed at which the steering angle is changing, in response to sensing the application of the vehicle brakes, the first side being the side to which a turn is being made; reducing the braking force which is applied to the second road wheel in accordance with the derived braking force difference, when the rate at which the steering angle is changing is high and the steering angle is relatively small; and reducing the braking force which is applied the first road wheel in accordance with the derived braking force difference when the rate at which the steering angle is changing is low and the steering angle is relatively large.

A second aspect of the present invention comes in a brake control system for an automotive vehicle comprising: means for sensing the steering angle; means for deriving the rate at which the steering angle is changing; means for sensing the application of the brakes; means for deriving the braking force difference which should be established between a road wheel on a first side of the vehicle and a road wheel which is on a second side of the vehicle using the sensed steering angle and derived speed at which the steering angle is changing, in response to sensing the application of the vehicle brakes, the first side being the side to which a turn is being made; means for reducing the braking force which is applied to the second road wheel in accordance with the derived braking force difference, when the rate at which the steering angle is changing is high and the steering angle is relatively small; and means for reducing the braking force which is applied the first road wheel in accordance with the derived braking force difference when the rate at which the steering angle is changing is low and the steering angle is relatively large.

A third aspect of the present invention comes in a vehicle including a braking system which features: first and second wheel cylinders operatively connected with first and second road wheels, the first and second road wheels being located at the front of the vehicle and arranged to be steerable, the first road wheel being located on a first side of the vehicle and the second road wheel being located on a second side of the vehicle; third and fourth wheel cylinders operatively connected with third and fourth road wheels, the third and fourth road wheels being located at the rear of the vehicle, the third road wheel being located on the first side of the vehicle and the fourth road wheel being located on the second side of the vehicle; a tandem master cylinder fluidly communicated with said first and second wheel cylinders by way of a front brake circuit and fluidly communicated with the third and fourth road wheels by way of a rear brake circuit; a source of hydraulic fluid under pressure, the source being selectively connectable with front and rear brake circuits in a manner to replace the pressure supplied by the master cylinder; first, second, third and fourth pressure control valves interposed between said master cylinder and said first, second, third and fourth wheel cylinders, each said first, second, third and fourth pressure control valves being independently operable to assume a first condition wherein pressure may be transmitted therethrough to the respective wheel cylinder, a second condition wherein pressure cannot be transmitted therethrough and the pressure in the wheel cylinder is maintained, and a third condition wherein pressure can be drained from the wheel cylinder; a steering sensor which senses a parameter indicative of the steering angle of the first and second road wheels; first, second, third and fourth wheel speed sensors which are associated with the first, second, third and fourth road wheels respectively; a brake switch which is responsive to the depression of a brake pedal; a master cylinder pressure sensor for sensing the pressure discharged by the master cylinder; first, second, third and fourth wheel cylinder pressure sensors respectively associated with the first, second, third and fourth wheel cylinders for sensing the pressure prevailing therein; a vehicle acceleration sensor; and control means operatively connected with the steering sensor, the first, second, third and fourth wheel speed sensors, the brake switch, the master cylinder pressure sensor, the first, second, third and fourth wheel cylinder pressure sensors, and the acceleration sensor, for: deriving the steering angle of the first and second road wheels; deriving the rate at which the steering angle is changing; determining the application of the brakes; deriving a braking force difference which should be established between the first and second road wheels using the sensed steering angle and derived rate at which the steering angle is changing; reducing the braking force which is applied to the one of the first and second road wheels by selectively operating the pressure valve which is associated therewith when the rate at which the steering angle is changing is high and the steering angle is relatively small; and reducing the braking force which is applied the other of the first and second road wheels in accordance with the derived braking force difference by selectively operating the pressure valve which is associated therewith when the rate at which the steering angle is changing is low and the steering angle is relatively large.

DETAILED DESCRIPTION OF THE PREFERRED EMBODIMENTS

Figure 1:
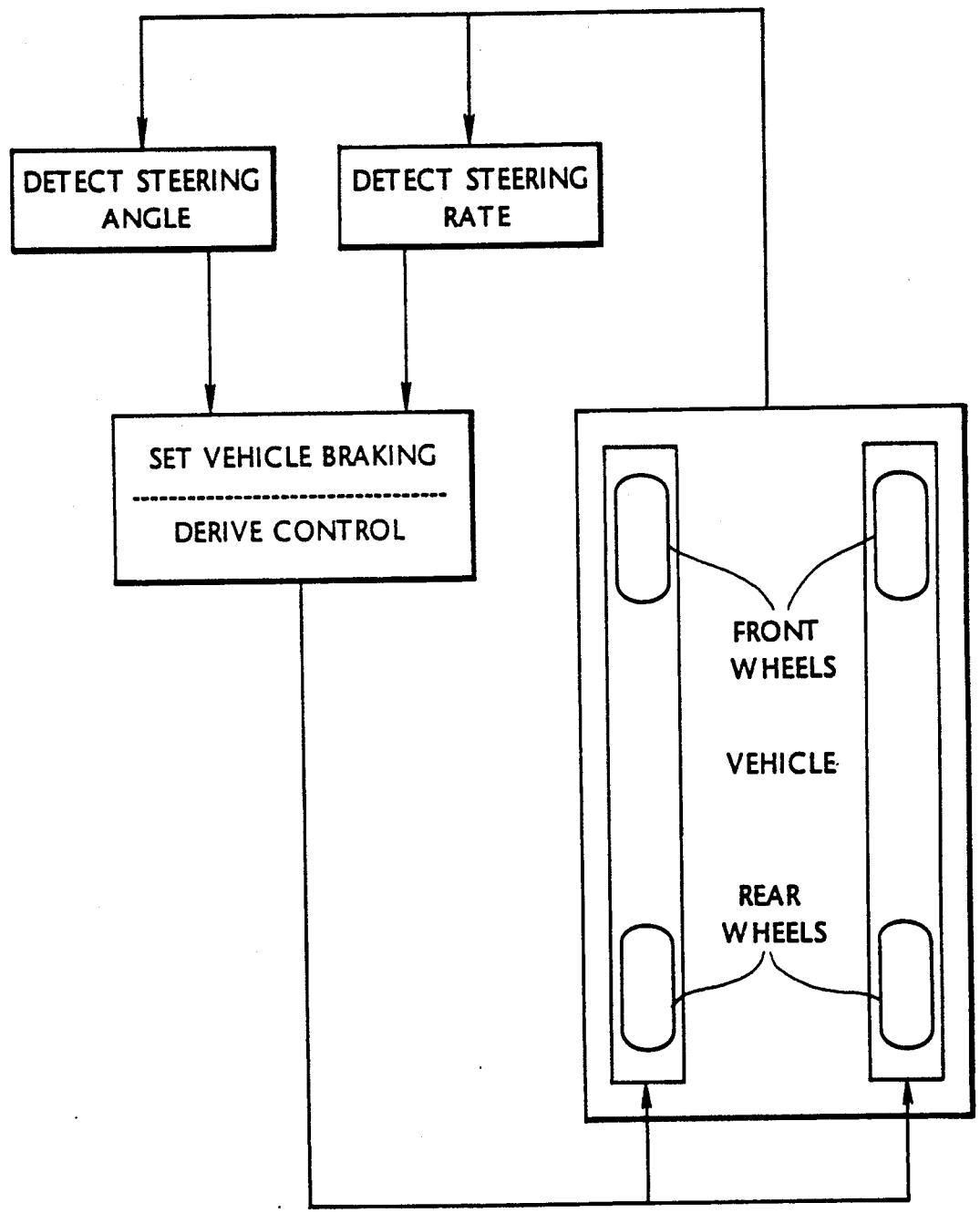
FIG. 1 is a schematic block diagram showing the concept on which the present invention is based.

FIG. 1 schematically shows the concept of the present invention.

Figure 2:
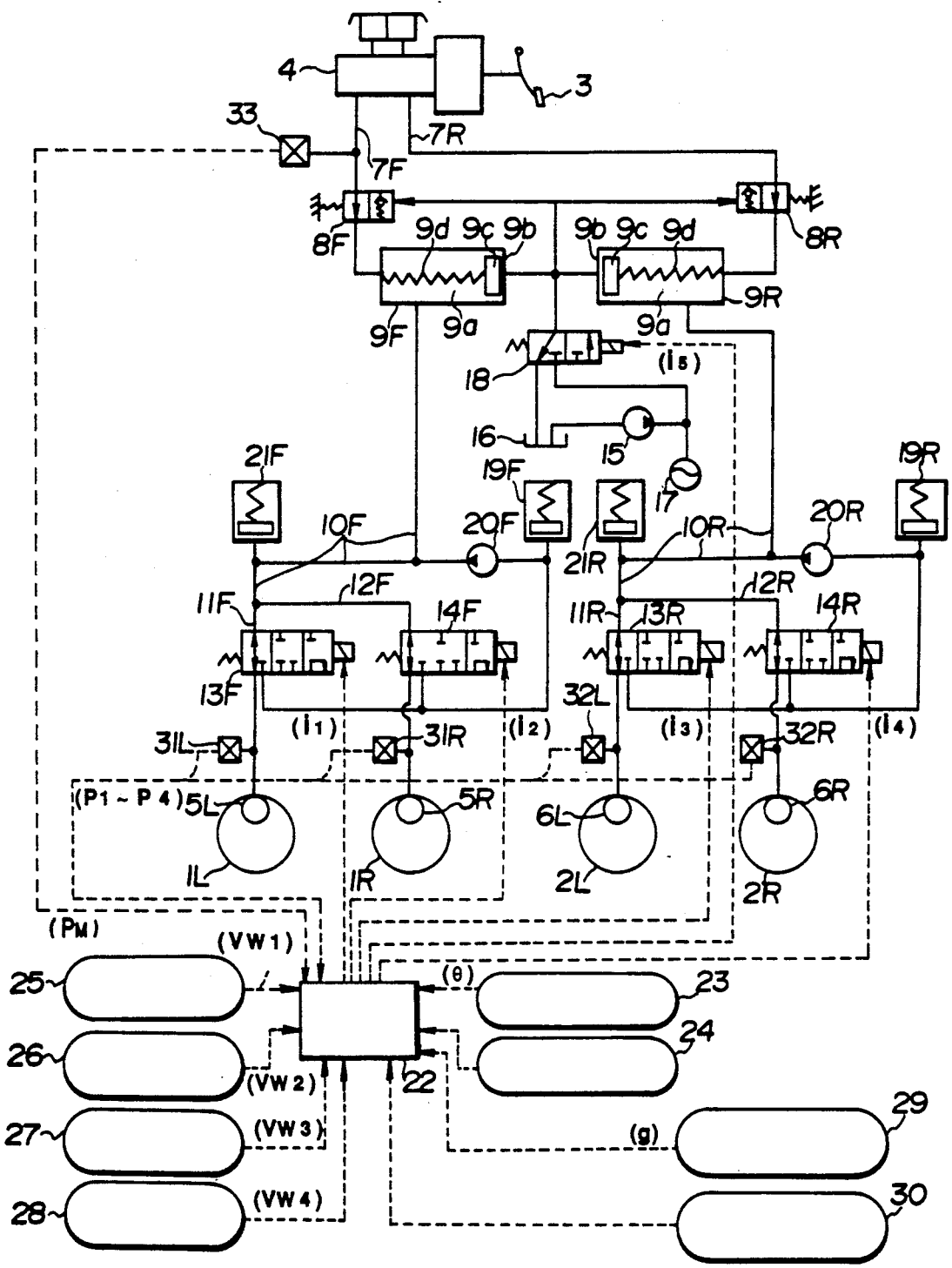
FIG. 2 is a schematic diagram showing the electronic and hydraulic control facets of a braking system to which the embodiments of the present invention are applied.

FIG. 2 schematically shows a braking control system to which the embodiments of the invention are applied. In this system the brakes which control the forward and rear wheels are arranged to be each capable of independent control.

In this figure, 1L and 1R denote the front left and right hand wheels respectively, 2L, 2R denote the rear left and right hand wheels respectively, 3 denotes a brake pedal, and 4 denotes a tandem master cylinder which is operatively connected with the brake pedal 3.

Road wheels 1L, 1R, 2L, 2R are each equipped with wheel cylinders 5L, 5R, 6L and 6R. These wheel cylinders are fluidly connected with the master cylinder 4.

A front brake circuit 7F includes a pressure responsive switching valve 8F, the output chamber 9a of a pilot cylinder 9F, branch conduits 10F, 11F and 12F, and fluid pressure control valves 13F, 14F which respectively communicate with the front left and right hand wheel cylinders 5L, 5R.

A rear brake circuit 7R includes a pressure responsive switching valve 8R, the output chamber 9a of a pilot cylinder 9R, branch conduits 10R, 11R and 12R, and fluid pressure control valves 13R, 14R which respectively communicate with the rear left and right hand wheel cylinders 6L, 6R.

A source of fluid under pressure which is used in the instant system includes: a pump 15, a reservoir 16 and an accumulator 17 which are fluidly communicated with input chambers 9b of pilot cylinders 9F and 9R, via an electromagnetically controlled switching valve 18.

When the braking system is not in use, the electromagnetically controlled switching valve 18, which is interposed between the pump 15 and the above mentioned chambers 9b, is arranged to drain the chambers 9b and cause the output of the pump 15 to charge the accumulator 17. In this instance the pump 15 is electrically driven and upon a predetermined pressure developing in the accumulator 17 the operation of the pump is stopped. Under these conditions, pistons 9c which are reciprocatively disposed in the pilot cylinders 9F and 9R assume the position illustrated in FIG. 2.

Upon the switching valve 18 being energized (ON) hydraulic pressure from the pump 15 and accumulator 17 are delivered into the chambers 9b thus causing the pistons to be driven against the springs 9d and reducing the volume of the output chambers 9a.

The pressure responsive switching valves 8F and 8R are arranged to establish fluid communication between the tandem master cylinder 4 and the output chambers 9a during non-automatic modes of operation, and to respond to the pressure which is supplied from the pump and accumulator when the electromagnetically controlled switching valve 18 is energized (ON) in a manner which cuts off said communication and thus prevents the pressurized hydraulic fluid which is being displaced out of the output chambers, from flowing back through the forward and rear circuits 7F and 7R to the tandem master cylinder 4.

The electromagnetically operated switching valve 18 is operatively connected with a control unit 22 which will be described in more detail later, and arranged such that a solenoid of the valve 18 is supplied with a current i5 therefrom. During non-automatic control periods the current i5 assumes a level 0A (zero level). During ON periods the value of current i5 rises to a level 2A. Further, during the ON period, as the reverse flow of hydraulic fluid is prevented, the effect of the brake pedal depression is negated and the outputs of the output chambers 9F and 9R alone are supplied into the branch conduits 10F and 10R. This, thus switches the braking control from a manual mode to a fully automatic one wherein the braking pressure is controlled in accordance with the pressure which is admitted to the input chambers 9b.

The pressure control valves 13F, 14F, 13R and 14R are operatively connected with the control unit 22 so as to be independently controllable and thus enable the braking force on each wheel to be selectively varied. That is to say, it is possible to individually control the pressures which are fed to the wheel cylinders 5L, 5R, 6L and 6R in a manner which enables anti-skid and similar control to be implemented.

In this instance, the pressure control valves 13F, 14F, 13R and 14R are arranged such that, when the solenoids which are incorporated therein, are OFF, the pressure development in the brake cylinders parallels the pressure which develops in the upstream conduits. In the event that the solenoids are energized to a first level, communication between the wheel cylinders and the source of pressure and the pressure prevailing in the wheel cylinders is maintained, while in the event that the solenoids are energized to a second level, the pressure control valves 13F, 14F, 13R and 14R are conditioned to permit the pressure in the wheel cylinders to reduce.

The pressure control valves 13F, 14F, 13R and 14R are respectively supplied with control currents i1~i4. When each of these currents assumes a 0A level, normal communication is established, when they are raised to a level 2A (the first level) the pressure in the wheel cylinders is maintained, while in the event that they assume a level 5A (second stage) the pressure reduction is permitted.

Reservoirs 19F and 19R are arranged to receive the hydraulic fluid which is drained from the wheel cylinders when the pressure control valves 13F, 14F, 13R and 14R are supplied with currents having a 5A level. Pumps 20F and 20R are arranged to induct fluid from these reservoirs and pump the fluid back into the branch passages 10F and 10R. Accumulators 21F and 21R are fluidly communicated with the branch passages 10F and 10R respectively and chargingly receive the excess hydraulic fluid. Of course these accumulators also charge during the stroking of the pistons 9c of the pilot cylinders 9F and 9R, when the electromagnetically operated switching valve is energized.

The control unit 22 is arranged to issue ON/OFF type duty signals to the above mentioned pressure control valves 13F, 14F, 13R and 14R and the electromagnetically operated switching valve 18 in response to data inputted thereto from a plurality of sensors.

In this instance the sensors comprise a steering angle sensor 23 which output a signal $\phi$ indicative of the steering angle, an ON/OFF type brake pedal switch 24 which is triggered in response to depression of the brake pedal 3, wheel speed sensors 25–28 which respectively output signals $Vw1 \sim Vw4$, and forward-aft acceleration and lateral acceleration sensors 29 and 30.

As will be readily understood, these signals are also used for anti-skid control, traction control, etc.

In accordance with the present invention, one of the parameters upon which control is based is vehicle speed. This can be of course derived from the inputs from the wheel speed sensors, or alternatively from some other source which is capable of producing a signal indicative of the vehicle speed (e.g. Doppler radar or optical ground speed sensors and the like).

A further parameter which is used is the rate or speed at which the steering angle is changing. In some instances a vehicle declaration parameter is used. This of course is derived from one or both of the outputs of the two acceleration sensors 29 and 30.

In addition to the above sensors, wheel cylinder pressure sensors 31R, 31L, 32L and 32R are arranged in the illustrate manner to determine the pressure prevailing in the wheel cylinders 5L, 5R, 6L and 6R, respectively. A pressure sensor 33 is arranged to detect the pressure output by the tandem master cylinder 4 into the forward circuit 7F and to issue a signal Pm indicative thereof.

In accordance with the data provided by each of the above mentioned sensors, the control unit 22 is arranged to determine a target pressure for each of the wheel cylinders and effect control which reduces the difference between the actual pressures and the targets, to zero.

The controller 22 includes a device such as microprocessor which includes means for receiving the data inputs, a CPU in which the data can be processed in accordance with predetermined control programs, tabled data and the like which are stored in ROM, and a memory such a RAM in which intermediate data can be recorded. As mentioned above, the control unit 22 is used for anti-skid, traction control and engine output control purposes etc., in addition to the cornering control which characterizes the present invention.

It should be noted that in the following discussion, the term inboard side refers to the wheels on the left side of the vehicle when the vehicle is turning left and the wheels on the right hand side of the vehicle when the vehicle is turning right. Outboard side refers to the wheels which are located on the right hand side of the vehicle during a left turn and on the left hand side when the vehicle is turning right.

The present invention is such that the steering control is based on the steering angle and the speed and rate at which the angle is changing. A first control feature or mode is that when the steering angle rate change is high and the steering angle is relatively small, a wheel or wheels on the outboard side are subject to a smaller braking force than the ones on the inboard side. This mode facilitates vehicle yaw. On the other hand, when the rate at which the steering angle is changing is relatively low and the steering angle is relatively large, a second control feature is that the braking force which is applied to an inboard wheel or wheels is reduced as compared with the braking force produced at the outboard side wheel. This mode stabilizes the vehicle yaw rate which is developed by the first mode.

Vehicle speed is used to weight the control. When the vehicle speed is low the first control feature is weighted while when the vehicle speed is high the second control feature is weighted.

When the vehicle deceleration is large the weighting of the first control feature is reduced while the second is increased.

When the vehicle is not turning and braking is induced, the braking is executed in accordance with normal anti-skid control. When the vehicle is being turned the wheels on the left and right hand sides of the vehicle are then controlled in the above manner in order to achieve the required stability.

In response to the application of the vehicle brakes, the movement of the brake pedal closes the brake switch and supplies a signal to the control unit 22. The control unit 22 responds by maintaining the electromagnetically operated switching valve 18 de-energized OFF (i5=0). In response to this, the pressure responsive valves 8F and 8R remain conditioned to permit communication between the master cylinder 4 and the four wheel cylinders. As long as wheel lock does not occur, the control unit 22 maintains the currents which control the pressure control valves 13F, 14F, 13R and 14R at zero levels (viz., i1~i4=0).

Accordingly, as the brake pedal is depressed the same pressure is simultaneously supplied from the master cylinder 4 to the wheel cylinders 5L, 5R, 6L, 6R, and braking of all of the vehicle road wheels 1L, 1R, 2L and 2R is induced.

The control unit 22 responds to the outputs (Vw1~Vw4) of the road wheel rotational speed sensors 25-28 and derives the vehicle speed and wheel slip ratios for each of the road wheels. The slip ratios are monitored in order to determine if wheel lock has occurred or not. In the event that lock is detected, then the appropriate pressure control valve or valves 13F, 14F, 13R and 14R are energized in a manner which conditions the same to assume the first stage wherein the pressure in the wheel cylinder or cylinders in question, from rising any further.

If wheel lock persists, the pressure control valve(s) in question are energized to assume the second stage whereat pressure is bled off from the appropriate wheel cylinder(s) and the road wheel(s) braking force reduced in a manner which allows the same to spin up. The control unit then returns the conditioning of the pressure control valve or valves in question, to the first stage and thus prevents the pressure in the wheel cylinder(s) from dropping any further. Depending on the rotational speed of the road wheel(s) in question the pressure control valve(s) is set to OFF. Rapid cycling through the above permits the skid to be controlled.

On the other hand, if the vehicle is subject to cornering, control according to the present invention is implemented.

The first embodiment of the present invention is such as to make use of two basic control parameters—the steering angle and the rate at which the steering angle is changing. During cornering, as the drive rotates the steering wheel the above described control features are such that the braking on the outboard side is reduced in response to rapid change in steering angle and subsequently braking on the inboard side is reduced in response to large steering angles.

Figure 3:
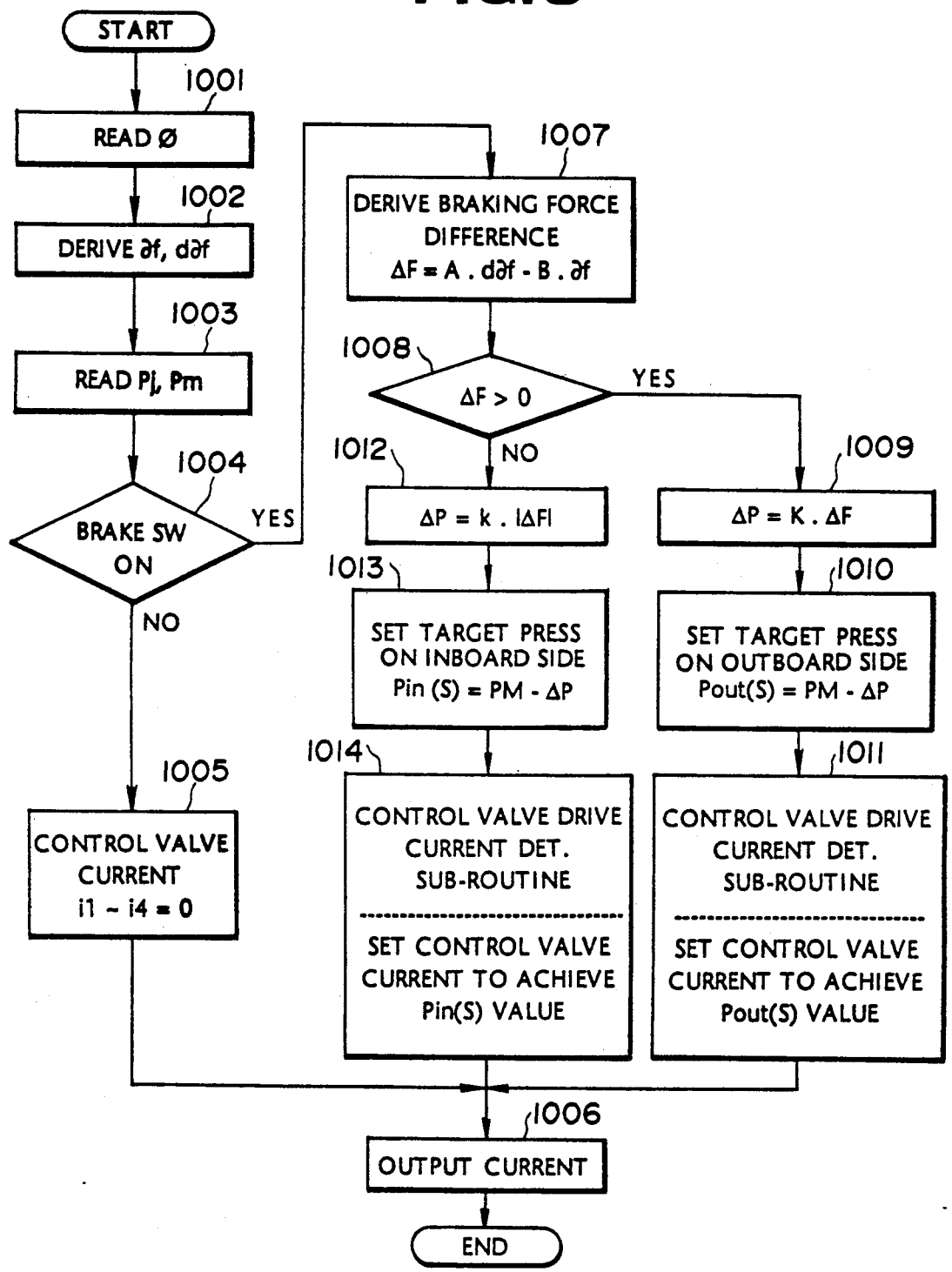
FIG. 3 is flow chart which depicts the steps which characterize a control routine according to a first embodiment of the present invention.

FIG. 3 shows, in flow chart form, the steps which characterize the operation of the first embodiment. This routine is run at predetermined time intervals via interrupt. The first step 1001 of this routine is such as to read the output $\phi$ from the steering angle sensor 23. Using this data the front steering angle $\partial f$ and the first time derivative thereof $d\partial f$ are derived (step 1002). In this case the steering angle $\partial f$ is derived using:

$$\partial f = \phi / N \quad (1)$$

wherein N denotes the steering gear ratio.

The $d\partial f$ value is derived as follows:

$$d\partial f = \frac{\partial f - \partial f(\text{old})}{\Delta t} \quad (2)$$

That is to say, the rate at which the steering is changing is determined by the difference between two consecutive readings divided by the sampling time $\Delta t$ (e.g. 10 ms).

Of course the present invention is not limited to this particular type of derivation technique and it is within purview of the same to utilize the output of a specially provided sensor to determine this value.

Having derived the $\partial f$ and $d\partial f$ values, the routine then proceeds to step 1003 wherein the wheel cylinder pressure Pj (in this embodiment the pressures P1 and P2 of the front wheel cylinders) and the master cylinder output pressure Pm are read in. Following this, at step 1004 the status of the brake switch 24 is determined, in order to establish if the driver has depressed the brake pedal 3 or not. In the event that the brake switch 24 is OFF indicating that the driver is not inducing braking at this time, the routine goes down to step 1005 wherein the currents i1-i4 which are supplied to the pressure control valves 13F, 14F, 13R and 14R, are set to zero.

Subsequently, at step 1006 the appropriate current requirements are implemented. In this particular case commands which maintain the level of the currents at 0A are issued thus maintaining the pressure control valves 13F, 14F, 13R and 14R in a de-energized state.

However, in the event that the outcome of step 1004 is such as to indicate that the brake pedal 3 has been depressed and the driver requires braking, the routine goes to step 1007 wherein the control which characterizes the present invention is implemented. Viz., the braking force difference which should be established between the left and right hand sets of road wheels $\Delta F$ is determined. In this embodiment $\Delta F$ value is derived using the following equation:

$$\Delta F = A \times d\partial f - B \times \partial f \quad (3)$$

wherein A and B are coefficients (A>0, B>0).

As will be appreciated the value of $\Delta F$ is increased in accordance with rate at which the steering angle is changing while reduced in accordance with the size of the steering angle. Depending of the magnitude of the two components the value of $\Delta F$ can be positive, negative or zero. In the event that the steering rate and angle are such as to bring about a positive $\Delta F$ value, the routine flows through step 1008 to steps 1009-1011 wherein the pressure in the outboard side wheel cylinder(s) is reduced in accordance with the magnitude of the difference. On the other hand, when $\Delta F$ is zero or less (negative) then the routine proceeds through step 1008 to steps 1012-1014 wherein the pressure which is applied to the inboard side wheel cylinder(s) is reduced.

Basically, the first component (A.d∂f) is such as to increase cornering ease (viz., the ease with which yaw can be induced) while the second (B.∂f) is such as to improve cornering stability. Depending on the magnitudes at which A and B are set, it is possible to modify the characteristics which are produced. Viz., if A is set a high value the ease with which yaw can be induced is increased as compared with a lower value. On the other hand, if B is set at high value the stabilizing effect which results is increased as compared with a lower B value. A and B can fixed and set individually from vehicle to vehicle, or alternatively rendered variable so as to enable a driver to manually select the characteristics which meet his or her tastes/requirements.

It will be noted that during a turn a driver will rotate the of steering wheel in a selected direction and bring about an initial situation wherein A.d∂f is relatively large and B.∂f is relatively small (resulting in a positive $\Delta F$ value). However, as time goes on the steering angle will increase and the amount steering wheel rotation will reduce. Thus, as some point $\Delta F$ will reduce to zero and subsequently become negative. Hence, as will be appreciated from the following discussion of steps 1009-1011 and 1012-1014, initially the pressure in the outboard side brake cylinders will be reduced. Depending on the turn characteristics, this pressure reduction will reduce to zero and subsequently the pressure in the inboard side brake cylinders will be reduced instead. Hence, the initial stage of the control is such as to facilitate vehicle cornering. Following this, at some point of the cornering phase the control will be changed and a stabilizing effect will be implemented.

More specifically, in the event that F is found to be positive at step 1008, at step 1009 the change in brake pressure $\Delta P$ which is required to achieve the required change in braking force is derived, Viz.,:

$$\Delta P = K \cdot \Delta F \quad (4)$$

wherein K is a variable coefficient.

Following this, at step 1010 the target pressure P out(S) for the outboard side front wheel cylinder is derived by decrementing the instant master cylinder pressure by $\Delta P$. Viz., $$Pout(S) = Pm - \Delta P \quad (5)$$

For example, let it be assumed that the vehicle is turning left. Under these circumstances, the pressure P1 (P1=Pm) which is being applied to the wheel cylinder of the front left hand road wheel 1L is taken as a standard and used to determine the pressure which should be supplied to the wheel cylinder 5R of the front right hand road wheel 1R (Viz., P1−$\Delta P$).

In step 1011 a sub-routine which determines the currents which are to be applied to the pressure control valves 13F, 14F, 13R and 14R is run. The current i2 which should be supplied the pressure control valve 14F in order to achieve the reduction of P2 to the target value Pout(S) is derived along with the currents which should be suppled to the other pressure control valves. In this instance it is sufficient that a pressure reduction to the front outboard road wheel wheel cylinder (5R) be implemented and it is sufficient to permit the master cylinder pressure Pm be supplied to the brake cylinders of the front left, and rear left and right road wheels. That is to say, set i1, i3 and i4 to OA (i.e. OFF). It will of course be appreciated that it is also possible to determine the duty cycle of ON/OFF control which will permit the pressure in the wheel cylinder in question to reduce to the target level. Feedback control via monitoring of the output of the appropriate wheel cylinder pressure sensor or sensors (in this case sensor 31R) is of course employed.

Following the determination of the i1-i4 current values which are required under the instant set of operating conditions, the routine flows to step 1006 wherein implementation of the same is carried out.

In the case that $\Delta F$ is found to be zero, then the routine opts for control which will increase stability and the routine proceeds to step 1013. As will be understood if the value of ∂f or d∂f is zero the value of the corresponding component A. d∂f and B. ∂f will become zero. Hence, when ∂f and d∂f are both zero $\Delta F = 0$. While $\Delta F = 0$ the value of $\Delta P$ will likewise become zero and no braking reduction on either side of the vehicle will be induced. Under these conditions all wheel cylinders will receive master cylinder pressure Pm unless of course some wheel slip is detected and anti-skid control is implemented.

On the other hand, in the event that the outcome of step 1008 is such as to indicate that $\Delta F$ is negative then at step $\Delta P$ is derived in the same manner as in the case of step 1009 with the single exception that the absolute value of $\Delta F$ is used in order to negate the negative nature of the value.

Step 1013 is basically similar to step 1010 and differs in that front outboard wheel cylinder pressure (P2 according to the instant example wherein the vehicle is turning left) is used as a standard (P2=Pm) for deriving the pressure reduction which need be applied to the wheel cylinder of the front inboard wheel.

Step 1014 parallels step 1011 and differs in that the current i1 which is supplied to pressure control valve 13F is determined and i2, i3 and i4 are left at OA.

Thus, as will be appreciated, as the inboard front wheel braking force is reduced, a slight oversteer type of effect will be induced which stabilizes the vehicle at this stage of the turn thus obviating the danger of spin or other undesirable effects being induced.

In brief, the instant embodiment is such that as the steering angle and the rate at which steering is being induced are both used, and the outboard braking force is reduced in response to rapid steering while the inboard force is reduced in response to large steering angles, it is possible to assist the initiation of cornering and then stabilize the same at a suitable timing. Further, with this technique it is not necessary to use yaw rate feedback control and the system can be rendered open loop.

SECOND EMBODIMENT

Figure 4:
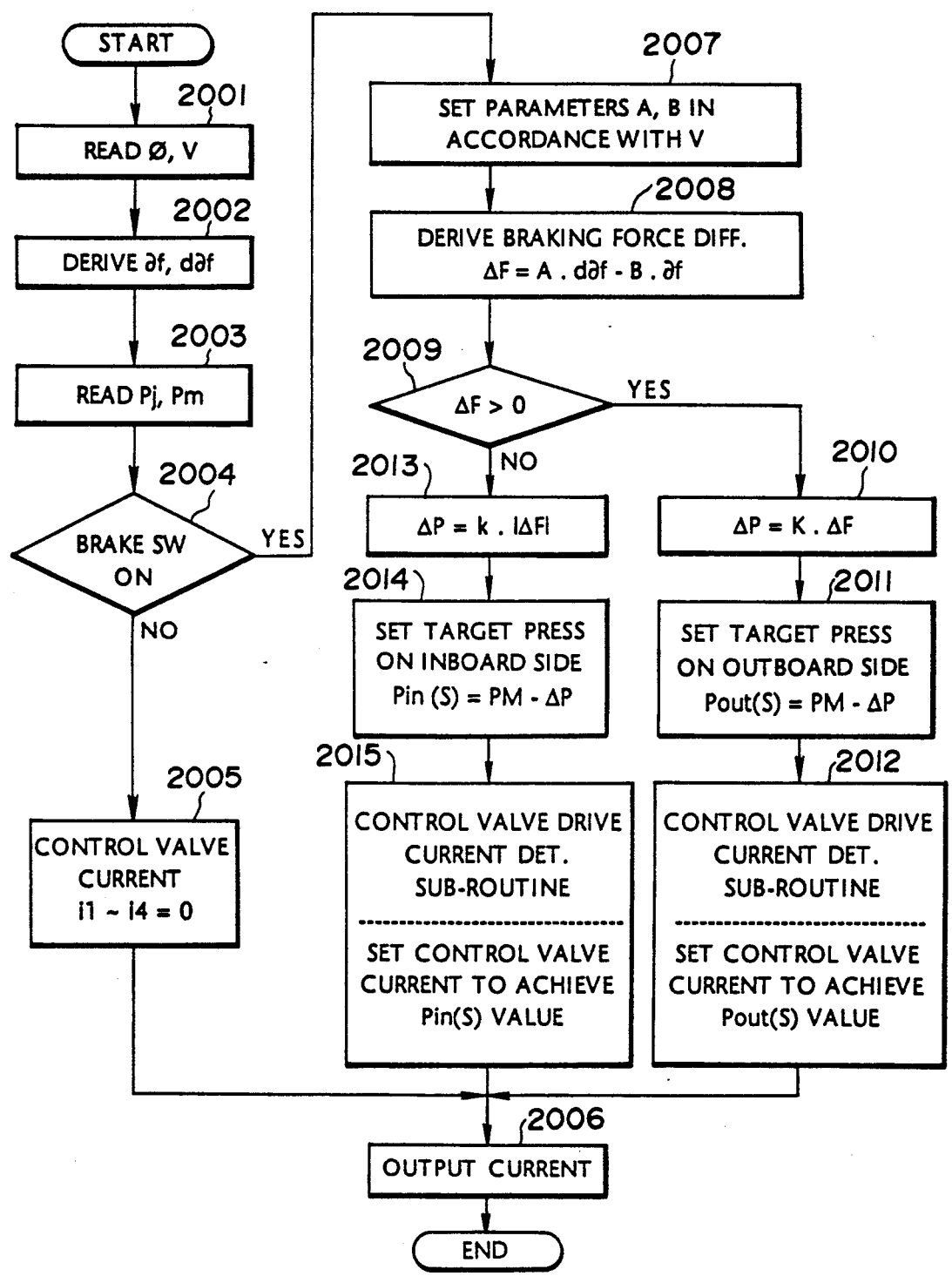
FIG. 4 is a flow chart which depicts the steps which characterize a control routine according to a second embodiment of the present invention.

FIG. 4 shown in flow chart form a control routine which characterizes a second embodiment of the present invention. As will be readily appreciated this embodiment is basically similar to the one shown in FIG. 3 and basically differs in that the control parameters A and B which are used in the derivation of the $\Delta F$ value are rendered variable with respect to vehicle speed.

Figure 7:
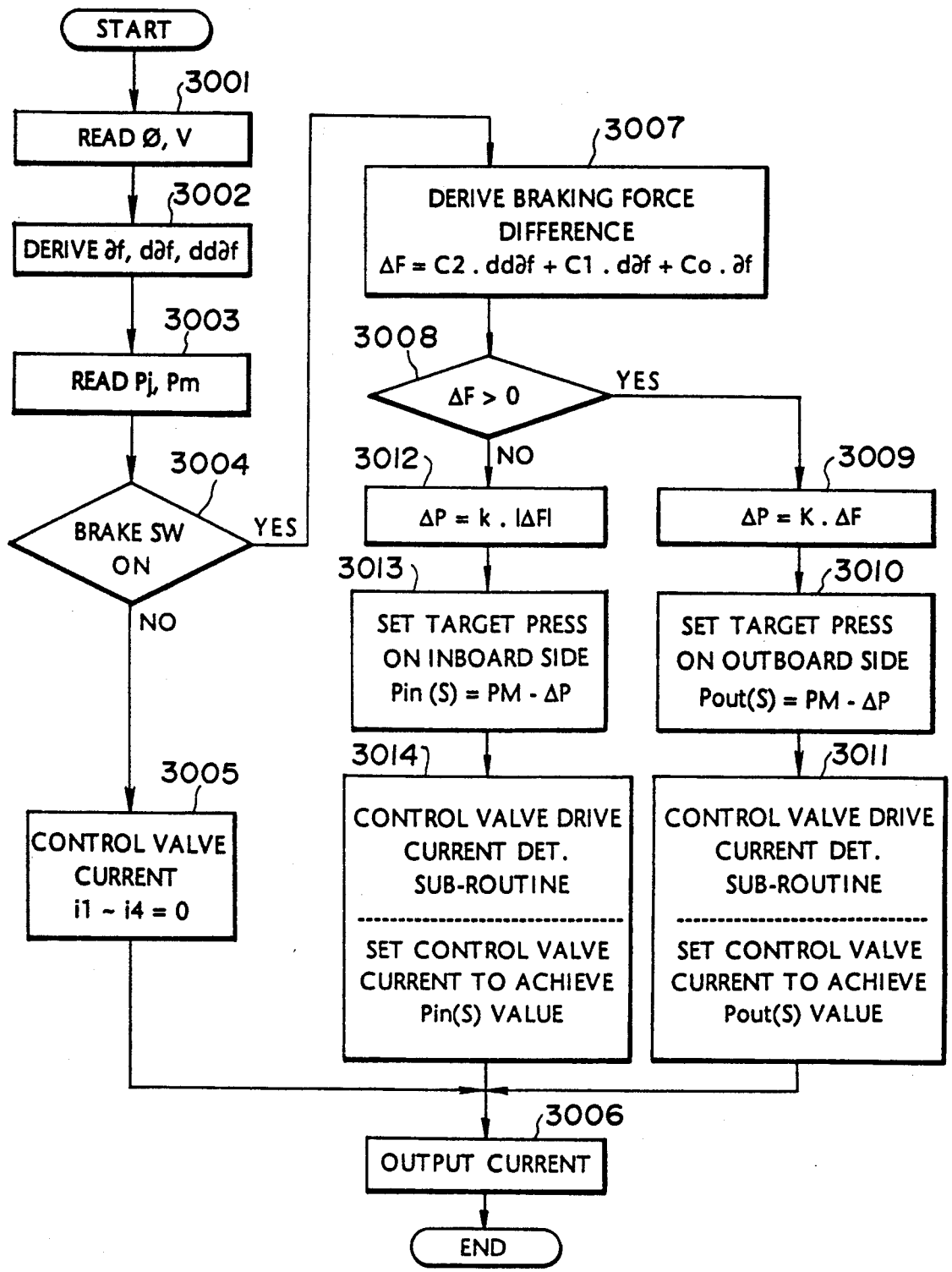
FIG. 7 is a flow chart which depicts the steps which characterize a control routine according to a third embodiment of the present invention.
Figure 12:
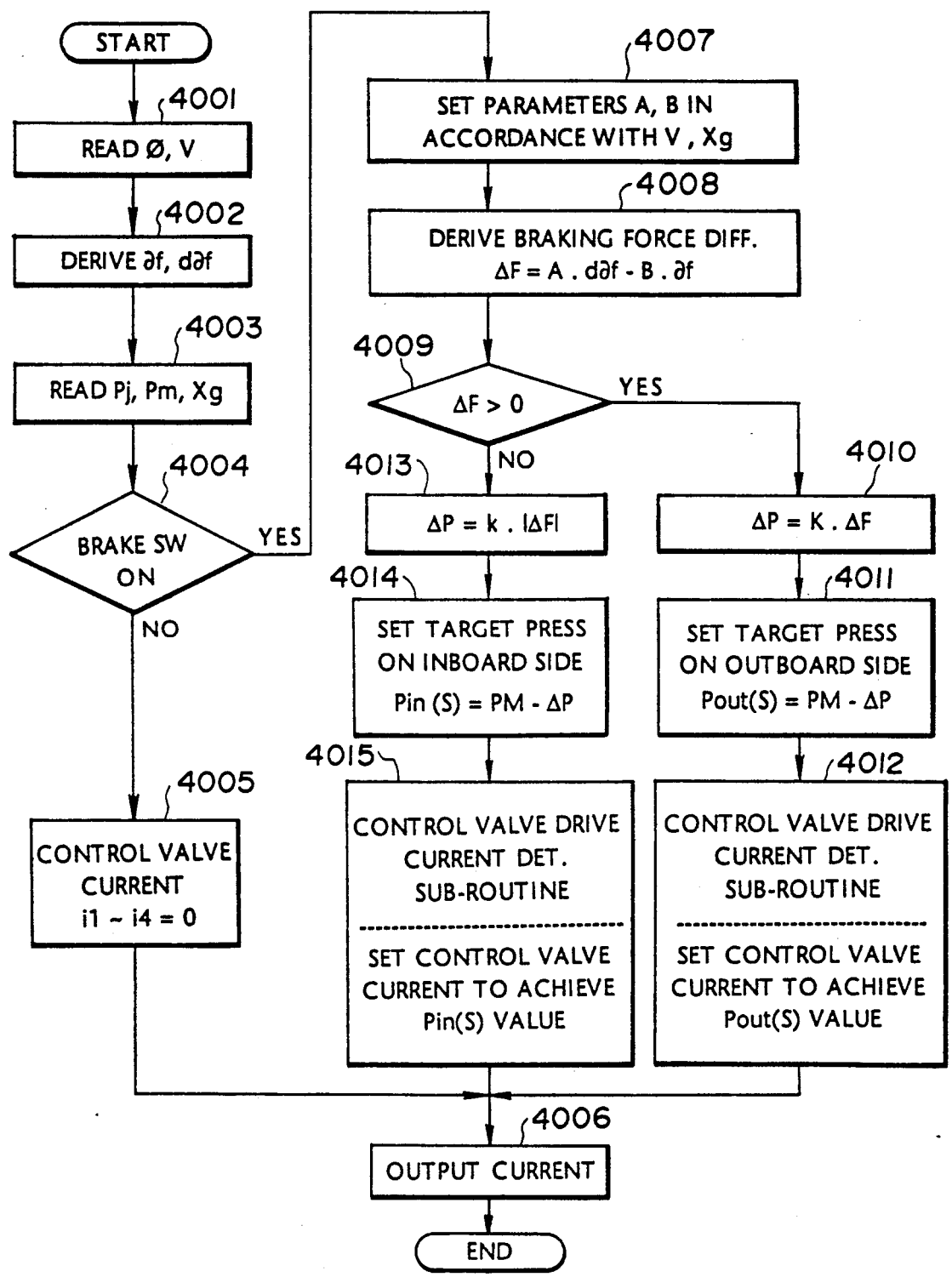
FIG. 12 is a flow chart which depicts the steps which characterize a control routine according to a fourth embodiment of the present invention.
Figure 15:
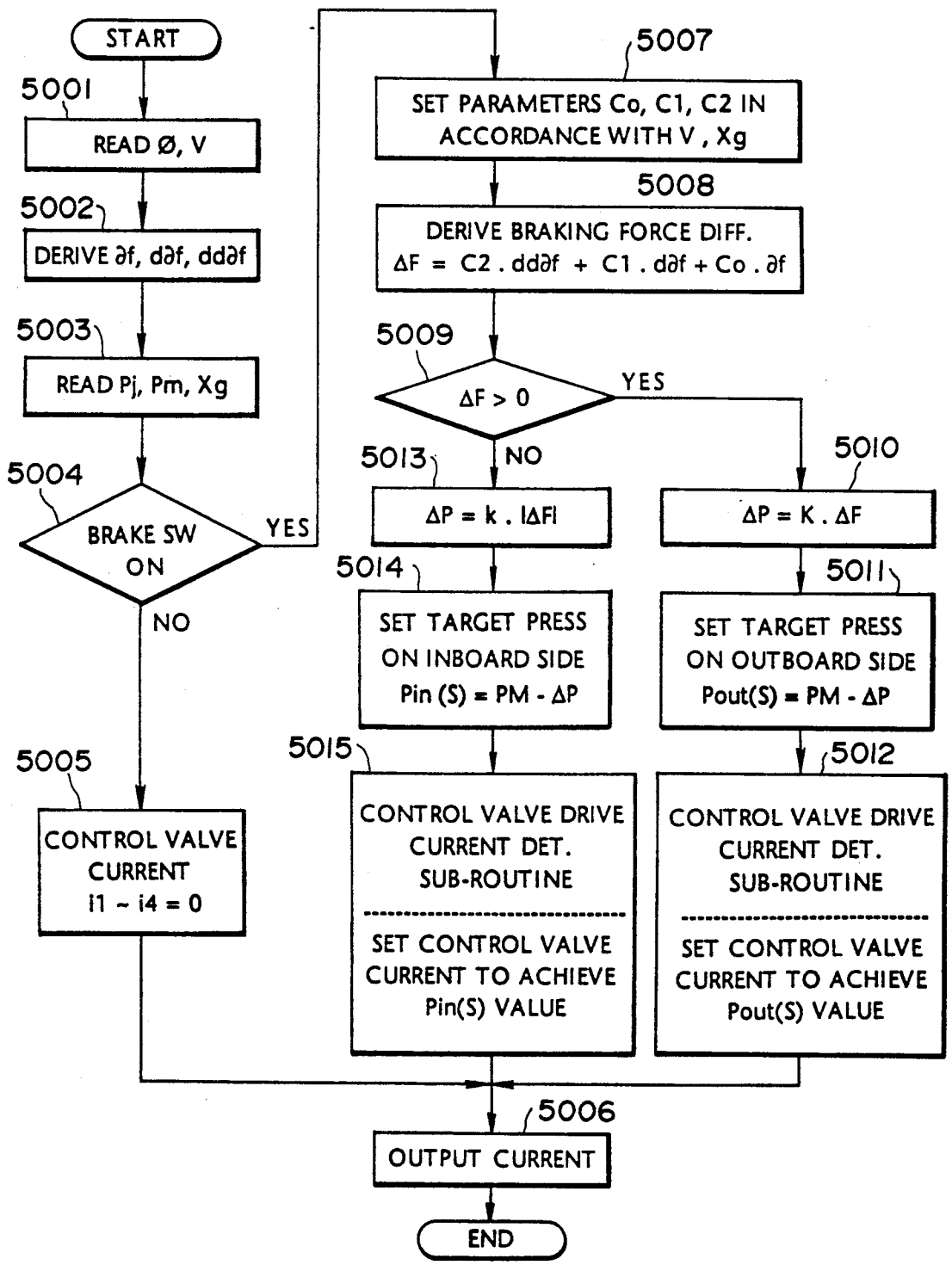
FIG. 15 is a flow chart which depicts the steps which characterize a control routine according to a fifth embodiment of the present invention.

This routine, along with those shown in FIGS. 7, 12 and 15 is run at predetermined intervals via interrupt in the same manner as disclosed in connection with the first embodiment.

At step 2001 the output of both steering sensor 23 and a vehicle speed sensor are read. As mentioned above, it is possible to use the output of a single sensor which is specially arranged to produce a signal indicative of vehicle speed or use the output of the wheel speed sensors in order to derive the same. The manner in which this data can be obtained will be well known to those skilled in the art to which the present invention pertains.

Figure 5:
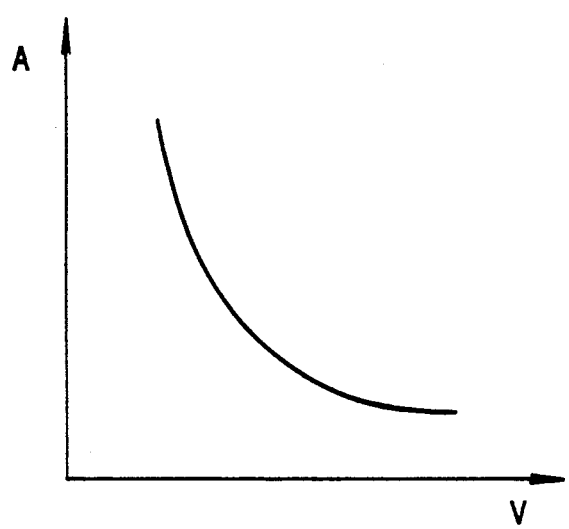
FIGS. 5 and 6 graphically show the manner in which parameters A and B which are used in connection with the second embodiment of the present invention, are derived.
Figure 6:
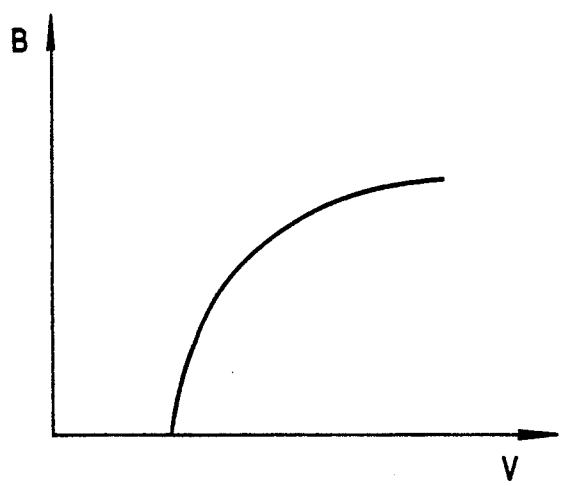

FIGS. 5 and 6 show examples of how the A and B control parameters can be arranged to vary with respect to vehicle speed (step 2007). In order to obtain the appropriate values of A and B it is possible to either record mapped data or utilize a suitable algorithm which will produce the required result. As will be appreciated, by rendering A and B responsive to engine speed, the value of $\Delta F$ is also rendered responsive to said parameter.

In the instant embodiment the value of A reduces with the increase in engine speed while parameter B exhibits the reverse characteristics. Accordingly, at low vehicle speeds the weighting of A is large (thus increasing the ease with which yaw is induced) while the weighting of B is low. Viz., at low speeds the amount amount of stabilization which will be required is small. On the other hand, at high speeds the reverse situation occurs wherein the weighting of B increases thus increasing the stabilizing effect while the weighting of A is reduced, thus reducing the ease with which yaw is induced.

The remaining control features are exactly the same those of the first embodiment and as such a redundant disclosure of the same will be omitted for the sake of brevity.

With the second embodiment, the responsitivity to vehicle speed improves the control characteristics which are obtained.

THIRD EMBODIMENT

The third embodiment of the present invention utilizes not only the steering angle, the first time derivative of the steering angle (steering angle speed d∂f) but also the second time derivative of the same (steering angle acceleration dd∂f). These three values are derived in step 3002. It will be noted that dd∂f can be either positive or negative (viz., acceleration or deceleration).

At step 3007 the $\Delta F$ value is derived using the following equation:

$$\Delta F = C2.dd\partial f + C1.d\partial f + Co.\partial f \tag{6}$$

Figure 9:
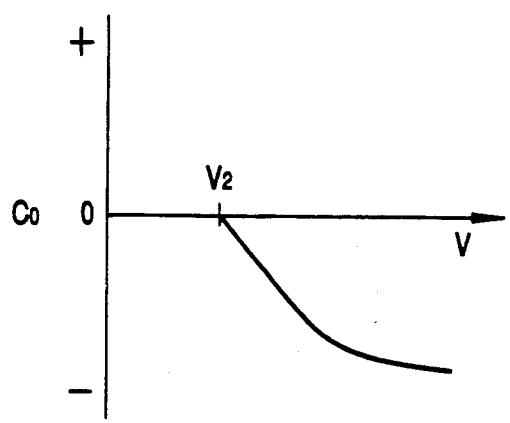
FIG. 9 graphically shows the manner in which a control parameter Co which is used in third embodiment of the present invention varies with respect to vehicle speed (V)
Figure 10:
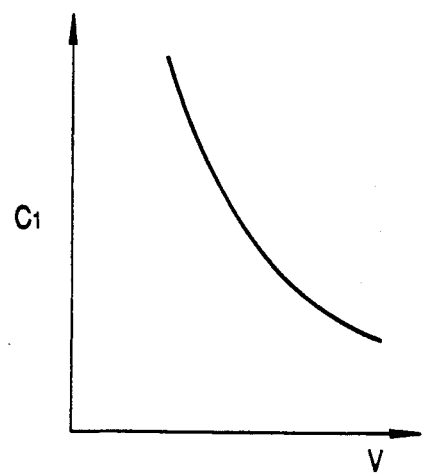
FIGS. 10 and 11 graphically show the manner in which control parameter C1 and C2 which are also used in the third embodiment of the present invention, vary with respect to vehicle speed (V)
Figure 11:
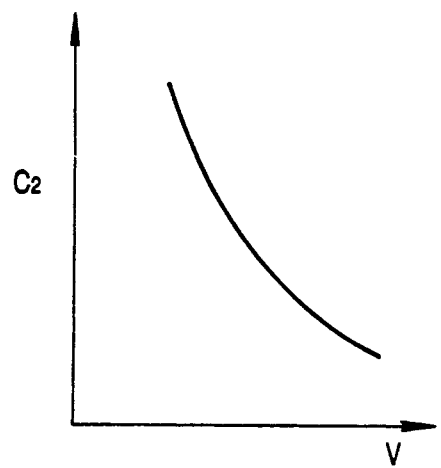

As will be noted the A and B control parameters are replaced with control parameters Co, C1 and C2 in this embodiment. FIGS. 9, 10 and 11 respectively show the characteristics of Co, C1 and C2 which are employed in the instant embodiment. As will be noted Co has no positive value (Co<0) and increases in magnitude with vehicle speed. On the other hand, the C1 and C2 parameter reduce with the increase of V (vehicle speed) are such that C2<0, C3<0.

With the instant embodiment, when the value of $\Delta F$ is negative the routine flows to stream wherein the braking force on the inboard side of the vehicle is reduced to improve stability, while in the event of a positive $\Delta F$ value the routine flow through the stream wherein the braking on the outboard side is reduced to facilitate yaw.

As will be appreciated, the value of Co is either zero or negative (above a predetermined vehicle speed V1) so that the last component (Co. ∂f) of the equation will either be zero or have a negative value above the predetermined vehicle speed V1, and thus tend to shift control in the direction of the stability mode of control. On the other hand, as C1 and C2 are constantly positive but decrease with vehicle speed, the effect of the second component is such as to shift the control in the direction of the mode which facilitates vehicle yaw at lower speeds. On the other hand, the effect of the first component can go in either direction (viz., dd∂f can be both positive and negative).

The remainder of the routine shown in FIG. 7 is the same as those described previously.

The inclusion of the dd∂f factor in the control provided by the third embodiment increases the responsiveness of the system to the manner in which the steering wheel is manipulated and thus enables suitable cornering control characteristics to be achieved.

Figure 8:
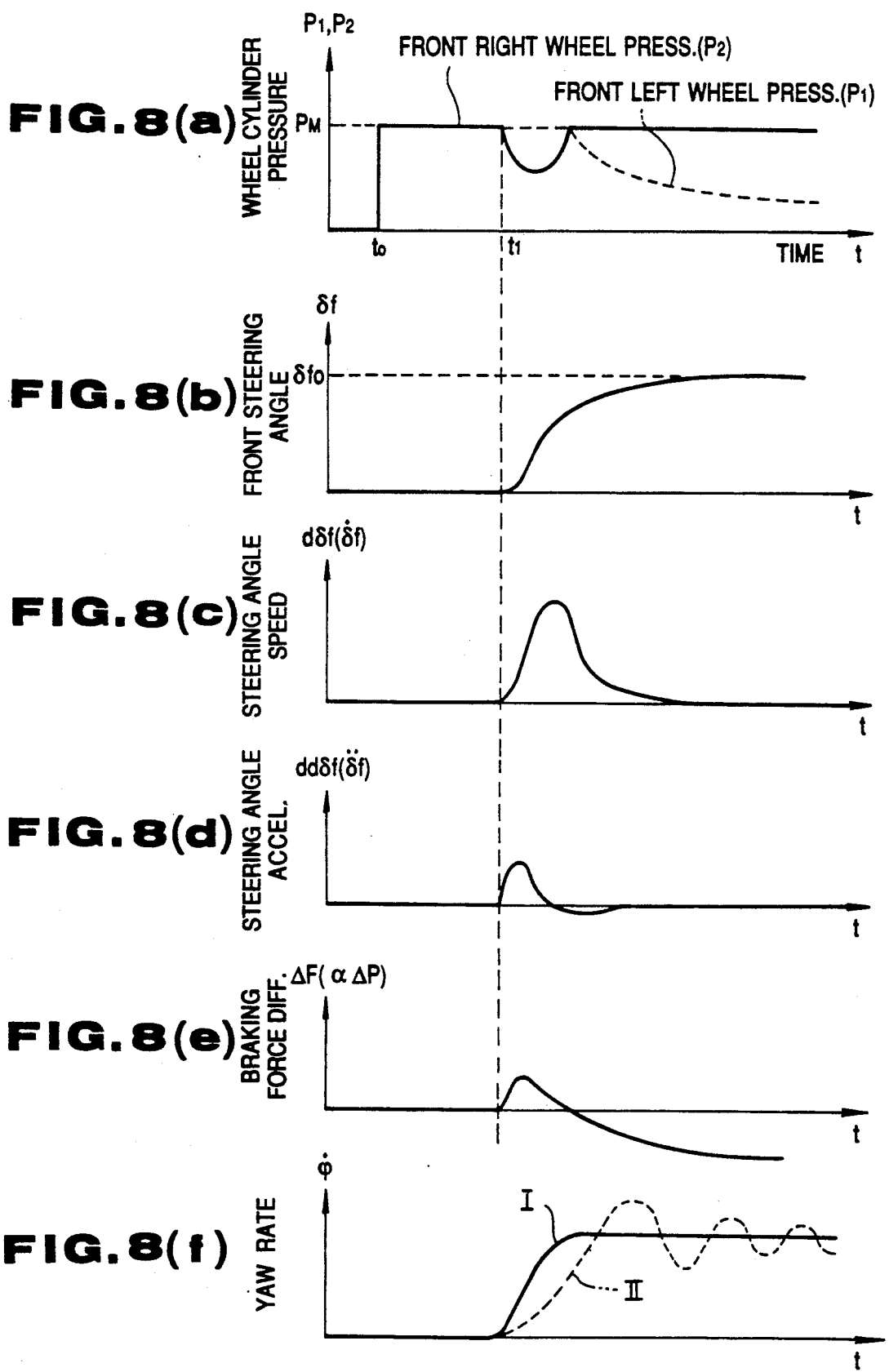
FIGS. 8(a)-8(f) are timing charts which demonstrate the manner in which various sensed parameters vary, the manner in which the braking force difference is developed and the resulting yaw rate characteristics which are produced, in accordance with the third embodiment of the present invention.

FIG. 8 demonstrates the operational characteristics of the third embodiment in timing chart form. Trace 8(a) shows the manner in which the pressures P1 and P2 which are supplied to the front left and right wheel cylinders, vary.

At time to the brake pedal 3 is depressed and at time t1 the driver suddenly rotates the steering wheel to the left until it reaches a given position indicated by ∂fo in chart 8(b). During the time period to-t1 the vehicle travels forward in a straight line and as shown in traces 8(c)-8(d). Until time t1 the values of ∂f, d∂f and dd∂f all remain at zero. Therefore, the value of $\Delta F$ ($\simeq \Delta P$) remains at zero as indicated in chart 8(c) thus causing the value of $\Delta P$ to also remain at zero. During this period the master cylinder pressure Pm rises and remains at a constant level (see chart 8(a)).

However, at time t1 due to the movement of the steering wheel (not shown) the value of ∂f increases (8(b)), and the values of d∂f and dd∂f both exhibit initial increases (viz., all three of the ∂f, d∂f and dd∂f values are initially positive. $\Delta P$ therefore rises due to the manner in which $\Delta F$ is derived in step 3007. Viz., even though the third component Co. d∂f is negative the first and second components are positive.

During the period $\Delta F$ is positive, pressure P2 which is prevailing in the front outboard wheel cylinder undergoes a reduction as indicated by the solid line trace thus facilitating the generation of yaw which rapidly rises as indicated by the solid line trace in chart 8(f). However, as the dd∂f and d∂f values peak and tend to decrease, the value of $\Delta F$ exhibits a downward gradient passes through zero and becomes negative. Accordingly, the level of P2 rises back up to Pm level at the time $\Delta F = 0$. Following this, as $\Delta P$ becomes negative, the level of pressure P1 (broken line trace) which is prevailing in the front inboard wheel cylinder begins to be reduced and mark the beginning of the stability mode of operation. Viz., the reduction in braking is switched from the outboard front wheel to the inboard one.

Consequently, the yaw rate (solid line trace I) levels off and assumes a stable essentially constant value.

The solid line trace I in chart 8(f) should be compared with the broken line trace II which depicts the yaw rate characteristics obtained with a conventional type of control technique. As will be noted the yaw rate is induced less rapidly and tends to overshoot the required level. After this it swings back and forth in the manner illustrated.

As mentioned above, the Co characteristics which are shown in FIG. 9 are such as to exhibit a zero value until a vehicle speed V1 is reached whereafter the Co exhibits a negative value. On the other hand C1 and C2 both exhibit large values at low speed and reduce rapidly as the vehicle speed increases. The stabilizing effect of these characteristics will be apparent.

FOURTH EMBODIMENT

FIG. 12 shows in flow chart form a control routine according to a fourth embodiment of the invention. This embodiment features the introduction of a vehicle deceleration parameter which is used in combination with vehicle speed V for the purposes of selecting the appropriate values of the A and B control parameters. At step 4008 the values of A and B are determined based on the vehicle speed V (as determined using the output of the wheel speed sensors for example) and one or both of the G sensors 29, 30.

Figure 13:
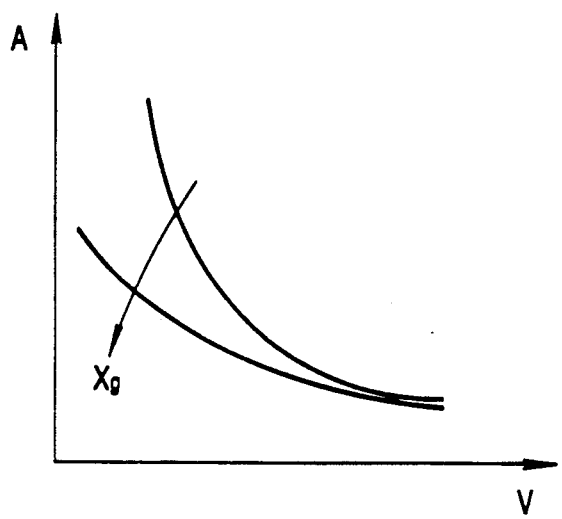
FIGS. 13 and 14 graphically show the manner in which the A and B control parameters vary with respect to vehicle speed and deceleration in accordance with a third embodiment of the present invention.
Figure 14:
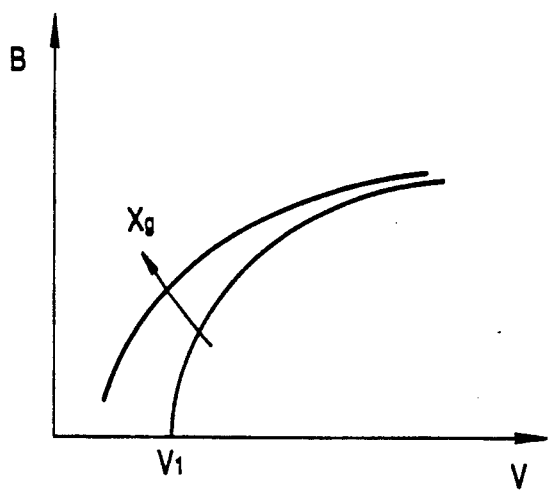

FIGS. 13 and 14 graphically show the manner in which the A and B control parameters are logged in terms of vehicle speed and vehicular deceleration Xg. As will be appreciated, as the vehicle speed increases the value of A tends to increase while the reverse is the case with parameter B. On the other hand, parameter A exhibits a reduction as the magnitude of the vehicular deceleration Xg increases. Parameter B exhibits an increase as the value of Xg increases.

The manner in which such data can be mapped and recorded and the stabilizing effect which will be provided at high speed/high decelerations will be apparent to those skilled in the art of vehicular control systems.

FIFTH EMBODIMENT

The fifth embodiment of the invention features the use of both the second time derivative of the steering angle (viz., $dd\partial f$) and vehicle deceleration Xg. In this embodiment the braking force is derived in step 5008 (FIG. 15) in accordance with the following equation:

$$\Delta F = C2.dd\partial f + C1,d\partial f + Co.\partial f \tag{7}$$

Figure 16:
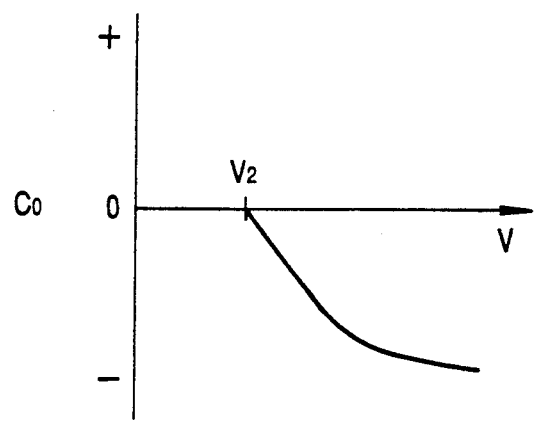
FIGS. 16–18 graphically show the manner in which control parameters C0, C1 and C2 vary with respect to vehicle speed and deceleration, in accordance with the fifth embodiment of the present invention.
Figure 17:
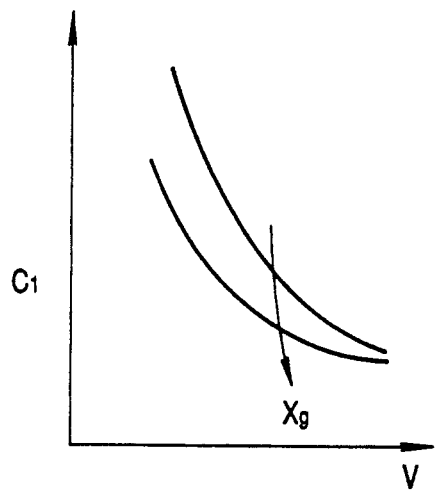
Figure 18:
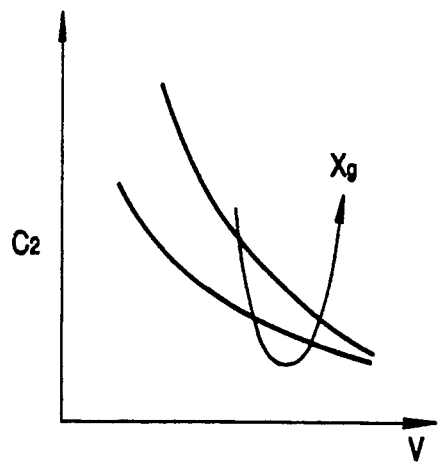

While this is the same as in the case of the third embodiment, the manner in which the C1 and C2 parameters are derived differs. As shown in FIGS. 16~18 the Co parameter is essentially the same as in the case of the third embodiment. That is Co, exhibits a zero value until a predetermined vehicle speed V2 is reached and thereafter rapidly becoming negative. The characteristics of the C1 parameter vary a little from those shown in FIG. 13 in that the vehicle speed response characteristics are a little steeper while the deceleration characteristics exhibit a near vertical trace. The most marked difference comes in the C2 parameter wherein the deceleration response characteristics exhibit a steep reduction from a relatively high value until a predetermined minimum value is reached and thereafter steeply increase again.

The effect of this is that while vehicle speed is high the Co parameter exhibit a negative value and the steering control is shifted toward the stabilizing mode. On the other hand, while the C1 and C2 parameters exhibit positive values they are such as to promote ease of cornering at low speeds. In addition, when the vehicle deceleration Xg is high the value of C1 is reduced while C2 is increased. However, upon Xg exceeding a given limit the value of C2 again increases. The reason for this is that when the vehicle is subject to very high decelerations it becomes difficult to hold the front wheels against the lateral acting forces and it is necessary under such conditions to increase the ease with yaw can be induced in order to overcome the inefficient steering.

SIXTH EMBODIMENT

It will be noted that in the embodiments thus far described, the pressure which is supplied to the wheels cylinders is not raised above master cylinder pressure level. The instant embodiment features the use of actuators means which enables the generation of pressures which are higher than master cylinder pressure and thus enable even more effective control characteristics to be achieved. As will become more apparent hereinafter, the instant embodiment enables the pressure supplied to one of the front wheels to be increased above master cylinder pressure level while simultaneously reducing the pressure in the other below said level.

Figure 19:
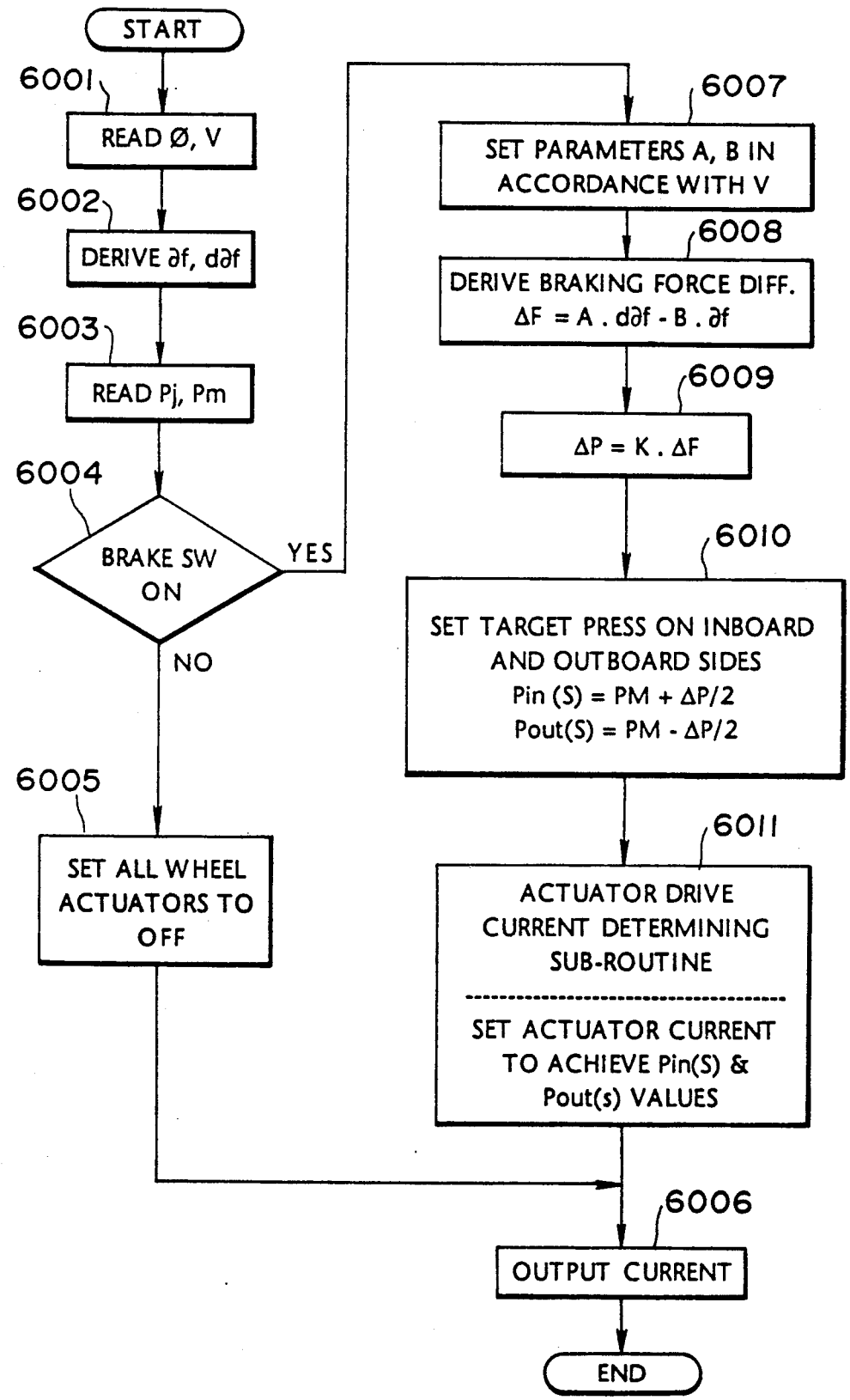
FIG. 19 is a flow chart which depicts the steps which characterize a control routine according to a sixth embodiment of the present invention.

FIG. 19 shows the control routine which characterizes the instant embodiment. As will be appreciated, steps 6001~6006 are essentially identical with the steps which are performed in connection with the first embodiment (c.f. steps 2001~2006 in FIG. 4). The only difference coming in that instead of setting the control currents 11~14 of the pressure control valves 13F, 14F, 13R and 14R, a command to set all of the wheel cylinder pressure control actuators means to an OFF state.

It should be noted at this stage that the above mentioned actuator means can be implemented with the hardware with illustrated in FIG. 2 or by using specially provided actuators. That is to say, with the existing hardware the actuator means can be achieved by energizing valve 18 in a manner which releases servo pressure into the pilot cylinders 9F and 9R and simultaneously energizing the pressure control valves 13R and 14R with 2A currents (viz., condition the pressure control valves which control the pressure prevailing in the rear cylinders to temporarily prevent the pressure in said cylinders from rising in response to the pressure increase which is induced by the stroking of the pistons 9b in the two pilot cylinders. At the same time, the pressure control valve which is associated with the wheel cylinder in which it is desired to increase the actuation pressure can be left left OFF while the pressure control valve which is associated with the wheel cylinder in which it is desired to reduced the pressure can be supplied with a 5A current and thus induced to assume a condition wherein some of the pressure downstream thereof is bled off. By monitoring the Pm pressure indicated by pressure sensor 33 and suitably adjusting the duty cycle/timing with which the valve 18 is opened and closed, and the timing with the pressure control valves 13F, 14F, 13R and 14R are shifted between their three possible positions, the desired pressure develop in each of the wheel cylinders can be controlled.

For simplicity of explanation reference will be made the actuator means only.

Steps 6007 to 6009 are deemed self-explanatory in view of the disclosure relating to the first embodiment (FIG. 3). Step 6010 are such as to determine the pressures which should be applied to the front inboard and outboard wheel cylinders. As will be noted the inboard pressure and the outboard pressure are respectively adjusted by half the required pressure change ΔP. Viz., $$P_{in}(S) = P_m + \Delta P/2 \quad (8)$$

$$P_{out}(S) = P_m - \Delta P/2 \quad (9)$$

It will be noted that when ΔF is negative, ΔP also becomes negative and vice versa. Accordingly, when ΔP is positive the actuator means is employed and above situation is achieved wherein the inboard pressure is increased while the outboard pressure is reduced. On the other hand, in the event that P is negative, the actuator means is operated so that the inboard pressure is reduced and the outboard level is increased (viz., plus×minus=minus and minus×minus=plus).

In the event that ΔF=0 then ΔP=0. Accordingly, no pressure reduction or increase with respect to the master cylinder pressure level is induced.

Figure 20:
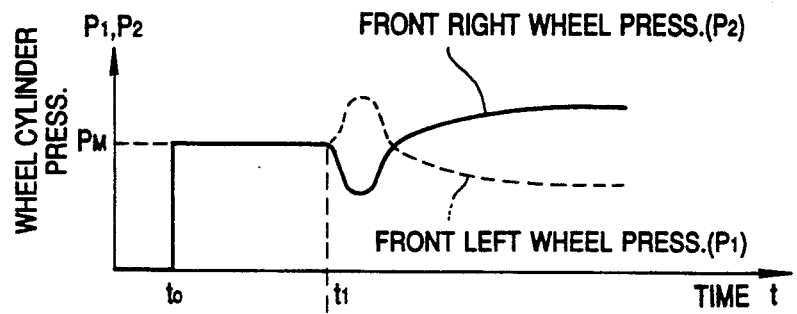
FIGS. 20(a)-20(e) are timing charts which demonstrate the operational characteristics of the sixth embodiment of the present invention.
Figure 20:
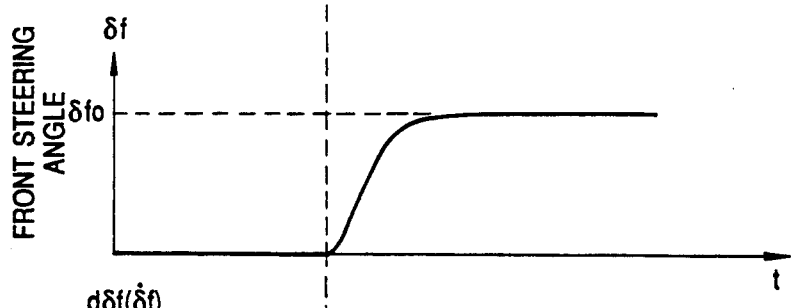
Figure 20:
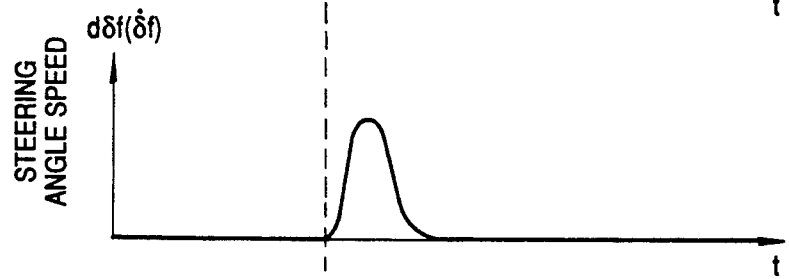
Figure 20:
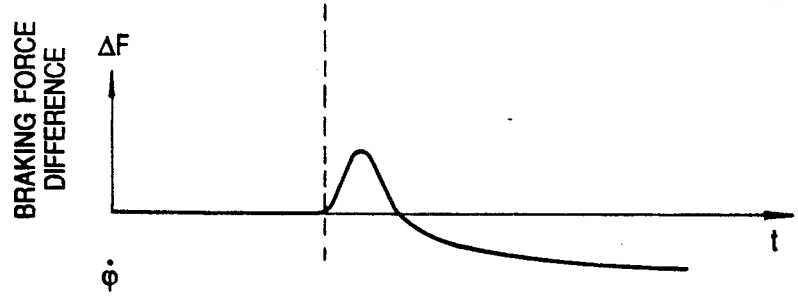
Figure 20:
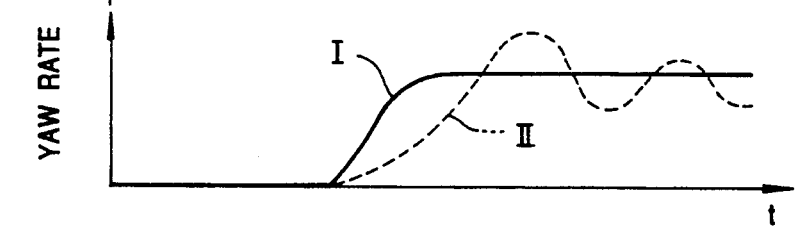

FIG. 20 demonstrates the operation which is achieved with the instant embodiment in timing chart form. In this instance it is assumed that the vehicle is turned left at time t1.

As will be appreciated, from chart 20(a) the difference between the control produced with the third embodiment (see timing chart of FIG. 8) comes in that while ΔF (chart 20(d)) is positive as pressure P1 which is applied to the front left wheel cylinder (inboard side), goes up, pressure P2 which is applied to the front right hand wheel cylinder (outboard side) goes down. At the time ΔF=0 pressures P1 and P2 become equal at master cylinder pressure level Pm and then reverse. The yaw rate characteristics which are achieved with this mode of control are depicted in chart 20(e).

VARIANTS

It will be noted that the invention is not limited to above described embodiments and that variations can be implemented without departing from the scope of the present invention. Merely by way of example, while the sixth embodiment has been disclosed as using the same ΔF derivation technique as the second embodiment, it is of course possible to use the techniques disclosed in connection with first and third to fifth embodiments in place thereof.

Further, while on the pressure in the front wheels has been disclosed, it is of course possible to suitably modify the pressure in the rear wheels in a parallel manner with or without additionally establishing a front/rear braking force differential.

What is claimed is:

1. A method of controlling a plurality of brakes of an automotive vehicle comprising the steps of:
   sensing a steering angle;
   deriving a rate at which said steering angle is changing;
   sensing an application of said brakes;
   deriving a target braking force difference which is desired to be established between a first road wheel on a first side of said vehicle and a second road wheel on a second side of said vehicle using said sensed steering angle and derived rate at which said steering angle is changing, in response to sensing said application of said brakes, said first side being a side to which a turn is being made;
   reducing a first braking force which is applied to said second road wheel in accordance with said target braking force difference, when said rate at which said steering angle is changing is relatively high; and
   reducing a second braking force which is applied to said first road wheel in accordance with said target braking force difference when said steering angle is relatively large.

2. A method as claimed in claim 1 further comprising the steps of:
   deriving an acceleration at which said steering angle is changing; and
   modifying derivation of said target braking force using said derived acceleration.

3. A method as claimed in claim 1 further comprising the steps of:
   sensing a vehicle deceleration; and
   adjusting said target braking force difference in accordance with a magnitude of said vehicle deceleration.

4. A method as claimed in claim 1 further comprising the steps of:
   sensing a vehicle deceleration; and
   adjusting said target braking force difference in accordance with a magnitude of said vehicle deceleration.

5. A method as claimed in claim 1 further comprising the steps of:
   increasing said second braking force which is applied to said first road wheel in accordance with said target braking force difference, when said rate at which said steering angle is changing is relatively high; and
   increasing said first braking force which is applied to said second road wheel in accordance with said target braking force difference when said steering angle is relatively large.

6. A method as claimed in claim 1 wherein the step of reducing the braking force which is applied to said second road wheel includes:
   sensing a pressure prevailing in a wheel cylinder associated with said second wheel; and
   feeding information indicative of said sensed pressure, back to a control unit which is responsive to said target braking force difference and which controls a device which controls a pressure being supplied to said wheel cylinder associated with said second road wheel.

7. A method as claimed in claim 1 wherein the step of reducing the braking force which is applied to said first road wheel includes:
   sensing a pressure prevailing in a wheel cylinder associated with said first wheel; and
   feeding information indicative of said sensed pressure, back to a control unit which is responsive to said target braking force difference and which controls a device which controls a pressure being supplied to said wheel cylinder associated with said first road wheel.

8. A brake control system in a vehicle comprising:
   a first wheel cylinder and a second wheel cylinder operatively connected with a first road wheel and a second road wheel respectively, said first and said second road wheels being located at the front of said vehicle and arranged to be steerable, said first road wheel being located on a first side of said vehicle and said second road wheel being located on a second side of said vehicle;
   a third wheel cylinder and a fourth wheel cylinder operatively connected with a third road wheel and a fourth road wheel respectively, said third and fourth road wheels being located at the rear of said vehicle, said third road wheel being located on said first side of said vehicle and said fourth road wheel being located on said second side of said vehicle;

a tandem master cylinder fluidly communicated with said first and said second wheel cylinders by way of a front brake circuit and fluidly communicated with said third and said fourth road wheels by way of a rear brake circuit;

a source of hydraulic fluid under pressure, said source being selectively connectable with said front and said rear brake circuits in a manner to replace pressure supplied by said master cylinder;

first, second, third and fourth pressure control valves interposed between said master cylinder and said first, second, third and fourth wheel cylinders respectively, each of said first, second, third and fourth pressure control valves being independently operable to assume a first condition wherein pressure may be transmitted therethrough to said first, second, third and fourth wheel cylinders, respectively, a second condition wherein pressure cannot be transmitted therethrough to said wheel cylinders and pressure in said wheel cylinders is maintained, and a third condition wherein pressure can be drained from said wheel cylinders;

a steering sensor which senses a parameter indicative of a steering angle of said first and second road wheels;

a first, second, third and fourth wheel speed sensors which are associated with said first, second, third and fourth road wheels respectively;

a brake switch which is responsive to depression of a brake pedal;

a master cylinder pressure sensor for sensing pressure discharged by said master cylinder;

first, second, third and fourth wheel cylinder pressure sensors respectively associated with said first, second, third and fourth wheel cylinders for sensing pressure prevailing therein;

a vehicle acceleration sensor; and control means operatively connected with said steering sensor, said first, second, third and fourth wheel speed sensors, said brake switch, said master cylinder pressure sensor, and said acceleration sensor, for:

deriving said steering angle of said first and said second road wheels;

deriving a rate at which said steering angle is changing;

determining an application of the brake pedal;

deriving a target braking force difference between said first and second road wheels using said derived steering angle and said derived rate at which said steering angle is changing;

reducing a first braking force which is applied to one of said first and second road wheels by selectively operating said pressure control valve which is associated therewith when the rate at which the steering angle is changing is relatively high and reducing a second braking force which is applied to the other of said first and second road wheels in accordance with said derived target braking force difference by selectively operating said pressure control valve which is associated therewith when said steering angle is relatively large.

9. A method of controlling the brakes of an automotive vehicle comprising the steps of:

sensing a steering angle;

deriving a rate at which said steering angle is changing;

deriving a first target amount by which a first braking force applied to a first road wheel is reduced with respect to a second braking force applied to a second road wheel, said first target amount based on said sensed steering angle and said derived rate, said first target amount by which increases with an increase in said steering angle; and deriving a second target amount by which said first braking force applied to said first road wheel is increased with respect to said second braking force applied to said second road wheel, said second target amount based on said sensed steering angle and said derived rate, said second target increasing with an increase in said rate at which said steering angle is changing.

10. A control system for a plurality of brakes of an automotive vehicle comprising:

means for sensing a steering angle;

means for deriving a rate at which said steering angle is changing;

means for sensing an application of said brakes;

means for deriving a target braking force difference which should be established between a first road wheel on a first side of said vehicle and a second road wheel which is on a second side of said vehicle using said steering angle and said rate at which said steering angle is changing, in response to sensing an application of said brakes, said first side being a side to which a turn is being made;

means for reducing a first braking force which is applied to said second road wheel in accordance with said derived target braking force difference, when said rate at which said steering angle is changing is relatively high; and means for reducing a second braking force which is applied to said first road wheel in accordance with said derived target braking force difference when said steering angle is large.

11. A brake control system as claimed in claim 10 further comprising:

means for deriving an acceleration at which said steering angle is changing; and means for modifying derivation of said target braking force difference using said acceleration.

12. A brake control system as claimed in claim 10 further comprising:

means for sensing a vehicle speed; and adjusting said target braking force difference in accordance with a magnitude of said vehicle deceleration.

13. A brake control system as claimed in claim 10 further comprising:

means for sensing a vehicle deceleration; and adjusting said target braking force difference in accordance with a magnitude of said vehicle deceleration.

14. A brake control system as claimed in claim 10 further comprising:

means for increasing said second braking force which is applied to said first road wheel in accordance with said target braking force difference, when said rate at which said steering angle is changing is relatively high; and means for increasing said first braking force which is applied to said second road wheel in accordance with said target braking force difference when said steering angle is relatively large.

15. A brake control system for an automotive vehicle comprising:
   means for sensing a steering angle;
   means for deriving a rate at which said steering angle is changing;
   means for deriving a target braking force difference between a road wheel on a first side of said vehicle and a road wheel which on a second side of said vehicle using said steering angle and said rate at which said steering angle is changing, in response to sensing an application of vehicle brakes, said first side being the inboard side of a turn;
   means for increasing a first braking force applied to said first road wheel relative to a second braking force applied to said second road wheel in accordance with said derived target braking force difference, when said rate at which said steering angle is changing is relatively high; and
   means for increasing said second braking force applied to said second road wheel relative to said first braking force applied to said first road wheel in accordance with said derived target braking force difference when said steering angle is relatively large.

16. A method of controlling a plurality of brakes of an automotive vehicle comprising the steps of:
   sensing a steering angle;
   deriving a rate at which said steering angle is changing;
   sensing an application of said brakes;
   deriving a target braking force difference between a first road wheel on a first side of said vehicle and a second road wheel on a second side of said vehicle using said steering angle and said rate at which said steering angle is changing, in response to sensing application of said brakes, said first side being the side to which a turn is being made;
   varying a first braking force which is applied to said first road wheel with respect to a second braking force which is applied to said second road wheel so that said first braking force which is applied to said first road wheel is higher than said second braking force which is applied to said second road wheel in accordance with said target braking force difference, when said rate at which said steering angle is changing is relatively high; and
   varying said second braking force applied to said second road wheel with respect to said first braking force applied to said first road wheel so that said second braking force applied to said second road wheel is higher than said first braking force applied to said first road wheel in accordance with said target braking force difference when said steering angle is relatively large.

17. A brake control system for an automotive vehicle comprising:
   means for sensing a steering angle;
   means for deriving a rate at which said steering angle is changing;
   means for sensing an application of a plurality of brakes;
   means for deriving a target braking force difference between a road wheel on a first side of said vehicle and a road wheel which on a second side of said vehicle using said steering angle and said rate at which said steering angle is changing, in response to sensing an application of said vehicle brakes, said first side being the side to which a turn is being made;
   means for increasing a first braking force applied to said first road wheel relative to a second braking force applied to said second road wheel in accordance with said target braking force difference, when said rate at which said steering angle is changing is relatively high; and
   means for increasing said second braking force applied to said second road wheel relative to said first braking force applied to said first road wheel in accordance with said target braking force difference when said steering angle is large.

18. A brake control system for an automotive vehicle comprising:
   means for sensing a steering angle;
   means for deriving a rate at which said steering angle is changing;
   means responsive to said steering angle for deriving a second target amount by which a first braking force applied to a first road wheel is reduced with respect to a second braking force applied to a second road wheel, said second target amount based on said sensed steering angle and said derived rate, increasing with increasing steering angle; and
   means responsive to said rate at which said steering angle is changing for deriving a second target amount by which said first braking force applied to said first road wheel is increased with respect to said second braking force applied to said second road wheel, the second target amount increasing with an increasing rate at which said steering angle is changing.

19. A method of controlling a plurality of brakes of an automotive vehicle comprising the steps of:
   sensing a steering angle;
   deriving a rate at which said steering angle is changing;
   means for sensing an application of said brakes;
   deriving a target braking force difference between a first road wheel on a first side of said vehicle and a second road wheel on a second side of said vehicle using said steering angle and said rate at which said steering angle is changing, in response to sensing an application of said brakes, said first side being the inboard side of a turn;
   increasing a first braking force which is applied to said first road wheel with respect to a second braking force which is applied to said second road wheel in accordance with said derived target braking force difference, when said rate at which said steering angle is relatively changing is high; and
   increasing said second braking force which is applied to said second road wheel with respect to said first braking force which is applied to said first road wheel in accordance with said derived target braking force difference when said steering angle is relatively large.

* * * * *